UNITED STATES PATENT OFFICE.

EDWIN P. JULIEN, OF SEATTLE, WASHINGTON.

PROCESS OF CURING, PACKING, AND PRESERVING FISH.

1,229,472.

Specification of Letters Patent. Patented June 12, 1917.

No Drawing. Application filed November 28, 1916. Serial No. 133,974.

*To all whom it may concern:*

Be it known that I, EDWIN P. JULIEN, a citizen of the United States, residing at Seattle, in the county of King and State of Washington, have invented a certain new and useful Improvement in Processes of Curing, Packing, and Preserving Fish, of which the following is a specification.

My invention relates to processes of curing, packing and preserving fish, and the object of my invention is to provide a novel process by which fish, as, for instance, salmon, may be preserved in prepared packages; and which fish thus prepared shall retain the flavor of freshly smoked fish together with all of the natural nutritious juices and oils that were contained in said fish when it was alive.

I accomplish this object by a process which consists, first, the fresh fish is properly cleaned by removing its head and entrails in the usual manner, then it is cured by the well known method of salting and smoking it, and, Second, the skin and bones together with the dry skin-like surface portion of the inner side of the fish, thus smoked, are removed from its body portion which body portion is then cut into thin slices which are then disposed in suitable containers, as glass jars, bottles or metal cans, and Third, the said skin, bones and said dry skin-like surface portion, so removed from the body of said fish, are disposed in a suitable cooking vessel with a suitable quantity of water and suitable seasoning condiments, and heated to the point of boiling and there maintained during a length of time sufficient to cause the water to extract all the nutritious oils and juices and the flavor contained in said skin, bones and dry skin-like surface portion, whereupon the contents of said vessel is strained through a sieve or other suitable strainer, and then a suitable quantity of the resultant fluid is poured into each of the said containers to permeate and cover the sliced fish contained therein whereupon said containers are hermetically sealed by any of well known means; said resultant fluid, by reason of the oil and condiments contained therein, being adapted to serve as a preservative of the contents of said containers; and also serving to impart to the product the natural flavor of smoked fish together with nutriment contained in said skin, bones and said dry skin-like portion of the surface of the inner side of the dressed fish.

If desired, instead of cutting said body portion into slices, it may be chopped or macerated to form a pulpy mass, which, when disposed in the containers, may be covered with said resultant fluid, portions of which fluid may permeate said pulpy mass in an obvious manner to preserve and flavor said pulpy mass.

Manifestly, in cases when the product is to be delivered to a consumer to be eaten within a short time it may be disposed in any convenient unsealed receptacle, or even in an open receptacle, instead of sealing it hermetically within a container.

Fish that is subjected to my above described process will be preserved for years in a condition to constitute a wholesome, nutritious and palatable article of food.

What I claim is:

1. The process of preparing packages containing prepared edible portions of fish which consists in the removal of the head and entrails; smoking the edible portions; removing from the body of the smoked edible portions the skin, bones and the dry skin-like surface portion of the inner side of said body; reducing said body to a form that is adapted to be disposed within containers that are adapted to be hermetically sealed; cooking said skin, bones and the dry skin-like portion of the inner side of the fish together with water and seasoning condiments for a length of time sufficient to cause the water to extract the nutritious oil and juices contained therein; straining the contents; and submerging the fish so prepared within the strained fluid.

2. The process of preparing the edible portions of fish as an article of food which consists in the removal of the head and entrails; smoking the edible portions; removing from the body of the smoked edible portions the skin, bones and the dry skin-like surface portion of the inner side of said body; reducing said body to a form that is adapted to be disposed within a suitable receptacle; cooking said skin, bones and the dry skin-like surface portion of the inner side of the fish together with water and seasoning condiments for a length of time sufficient to cause the water to extract the nutritious oil and juices contained therein; straining the contents; and submerging the fish so prepared within the strained fluid.

3. The process of preparing edible portions of fish as an article of food which consists of smoking said edible portions and reducing them to a pulpy mass, and submerging said pulpy mass in a seasoned preservative fluid disposed within a suitable container.

In witness whereof, I hereunto subscribe my name this 20th day of November A. D., 1916.

EDWIN P. JULIEN.

Witnesses:
 GEO. BLAIR,
 FRANK WARREN.

Copies of this patent may be obtained for five cents each, by addressing the "Commissioner of Patents, Washington, D. C."